(12) United States Patent
Chiang et al.

(10) Patent No.: US 10,185,870 B2
(45) Date of Patent: Jan. 22, 2019

(54) IDENTIFICATION SYSTEM AND IDENTIFICATION METHOD

(71) Applicant: INSTITUTE FOR INFORMATION INDUSTRY, Taipei (TW)

(72) Inventors: Chen-Kuo Chiang, Chiayi County (TW); Chih-Hsiang Yu, Keelung (TW); Bo-Nian Chen, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 86 days.

(21) Appl. No.: 15/499,878

(22) Filed: Apr. 27, 2017

(65) Prior Publication Data

US 2018/0253594 A1 Sep. 6, 2018

(30) Foreign Application Priority Data

Mar. 3, 2017 (TW) .............................. 106107076 A (51) Int. Cl.
*G06K 9/00* (2006.01)
*G06N 99/00* (2010.01)
*G06K 9/50* (2006.01)

(52) U.S. Cl.
CPC .......... *G06K 9/00335* (2013.01); *G06K 9/50* (2013.01); *G06N 99/005* (2013.01)

(58) Field of Classification Search
CPC ..... G06K 9/00335; G06K 9/50; G06N 99/005

USPC ......................................................... 382/156
See application file for complete search history.

(56) References Cited

U.S. PATENT DOCUMENTS

| 2015/0278642 | A1* | 10/2015 | Chertok ................... G06N 3/02 382/156 |
| 2016/0044357 | A1* | 2/2016 | Wang ................. H04N 21/2668 725/14 |

* cited by examiner

*Primary Examiner* — Amandeep Saini
(74) *Attorney, Agent, or Firm* — CKC & Partners Co., Ltd.

(57) ABSTRACT

An identification method includes: sensing movement data; capturing multiple feature data from the movement data; cutting the first feature data into a plurality of first feature segments, dividing the first feature segments into a plurality of first feature groups, and calculating multiple first similarity parameters of the first feature groups respectively corresponding to a plurality of channels; making the first feature groups correspond to the channels according to the first similarity parameters; simplifying the first feature groups corresponding to the channels respectively by a convolution algorithm to obtain a plurality of first convolution results corresponding to the first feature groups; simplifying the first convolution results corresponding to the first feature groups respectively by a pooling algorithm to obtain multiple first pooling results corresponding to the first feature groups; and combining the first pooling results corresponding to the first feature groups to generate a first feature map.

20 Claims, 9 Drawing Sheets

| M1 | M2 | M3 | M4 | M5 |
|---|---|---|---|---|
| M6 | M7 | M8 | M9 | M10 |
| M11 | M12 | M13 | M14 | M15 |
| M16 | M17 | M18 | M19 | M20 |
| M21 | M22 | M23 | M24 | M25 |

KR

| K1 | K2 | K3 |
|---|---|---|
| K4 | K5 | K6 |
| K7 | K8 | K9 |

Fig. 6

PLI

| R1 | R2 | R3 |
|---|---|---|
| R4 | R5 | R6 |
| R7 | R8 | R9 |

PLO

| S1 | S2 |
|---|---|
| S3 | S4 |

IDENTIFICATION SYSTEM AND IDENTIFICATION METHOD

CROSS-REFERENCE TO RELATED APPLICATION

This application claims priority to Taiwan Application Serial Number 106107076, filed Mar. 3, 2017, which is herein incorporated by reference.

BACKGROUND

Field of Invention

The present invention relates to an identification system and an identification method, and in particular to an identification system and an identification method which are used for identifying motions.

Description of Related Art

At present, a motion identification method applied to an electronic device is mainly used to perform model training, state identification or continuous monitoring, such as operation in a game and identification of abnormal behaviors, through machine learning and statistical analysis. However, when there are many kinds of a user's motions or the motion differences are insufficient, the motions are easily confused in the existing motion identification method, so that it is difficult to accurately identify key features of the motions.

SUMMARY

The invention provides an identification system includes a processor. The processor is used for receiving a movement data from a sensing device, and the processor includes a preprocessing module, a data cutting module, a channel matching module, a data integration module and a model training module. The preprocessing module is used for capturing a plurality of feature data from the movement data. The feature data include a first feature data and a second feature data. The data cutting module is used for cutting the first feature data into a plurality of first feature segments, dividing the first feature segments into a plurality of first feature groups and calculating a plurality of first similarity parameters of the first feature groups respectively corresponding to a plurality of channels. The channel matching module is used for making the first feature groups correspond to the channels according to the first similarity parameters. The data integration module is used for simplifying the first feature groups corresponding to the channels respectively by a convolution algorithm to obtain a plurality of first convolution results corresponding to the first feature groups, simplifying the first convolution results corresponding to the first feature groups respectively by a pooling algorithm to obtain a plurality of first pooling results corresponding to the first feature groups, combining the first pooling results corresponding to the first feature groups to generate a first feature map, substituting the first feature map and a second feature map into the convolution algorithm again to obtain a second convolution result, and substituting the second convolution result into the pooling algorithm again to obtain a second pooling result. The model training module is used for substituting the second pooling result into a model training algorithm to generate an identification model.

The invention provides an identification method. The identification method includes sensing a movement data; capturing a plurality of feature data from the movement data; wherein the feature data include a first feature data and a second feature data; cutting the first feature data into a plurality of first feature segments, dividing the first feature segments into a plurality of first feature groups, and calculating a plurality of first similarity parameters of the first feature groups respectively corresponding to a plurality of channels; making the first feature groups correspond to the channels according to the first similarity parameters; simplifying the first feature groups corresponding to the channels respectively by a convolution algorithm to obtain a plurality of first convolution results corresponding to the first feature groups; simplifying the first convolution results corresponding to the first feature groups respectively by a pooling algorithm to obtain a plurality of first pooling results corresponding to the first feature groups; combining the first pooling results corresponding to the first feature groups to generate a first feature map; substituting the first feature map and a second feature map into the convolution algorithm again to obtain a second convolution result; and substituting the second convolution result into the pooling algorithm again to obtain a second pooling result; and substituting the second pooling result into a model training algorithm to generate an identification model.

By means of the identification system and the identification method of the present invention, features can be captured automatically according to a time sequence. The sustained and the non-sustained motions can be analyzed clearly. The sustained motions represent that the same motion (e.g., teeth are always brushed transversely) is performed during a period of time (such as 3 min) and repeated for many times. The non-sustained motions may be a single specific motion or various continuous motions. For example, the single specific motion represents that a circle drawing motion is performed during a period of short time (e.g., 1 second), and the circle drawing motion is performed only once. The various continuous motions, namely continuous motions, represent that a plurality of "single specific motions" (e.g., a circle drawing motion is followed by a lightning motion, and the lightning motion is followed by a hack and slash motion, and the motions also includes a plurality of circle drawing motions) are performed during a period of time (such as 30 seconds). By distinguishing each one of the serial motions, the present invention can distinguish the motion differences more accurately, so as to achieve an effect of improving motion identification precision. Moreover, by application of the pooling algorithm and the convolution algorithm, in the present invention the calculation amount can be greatly reduced, and key motion features can be obtained precisely.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
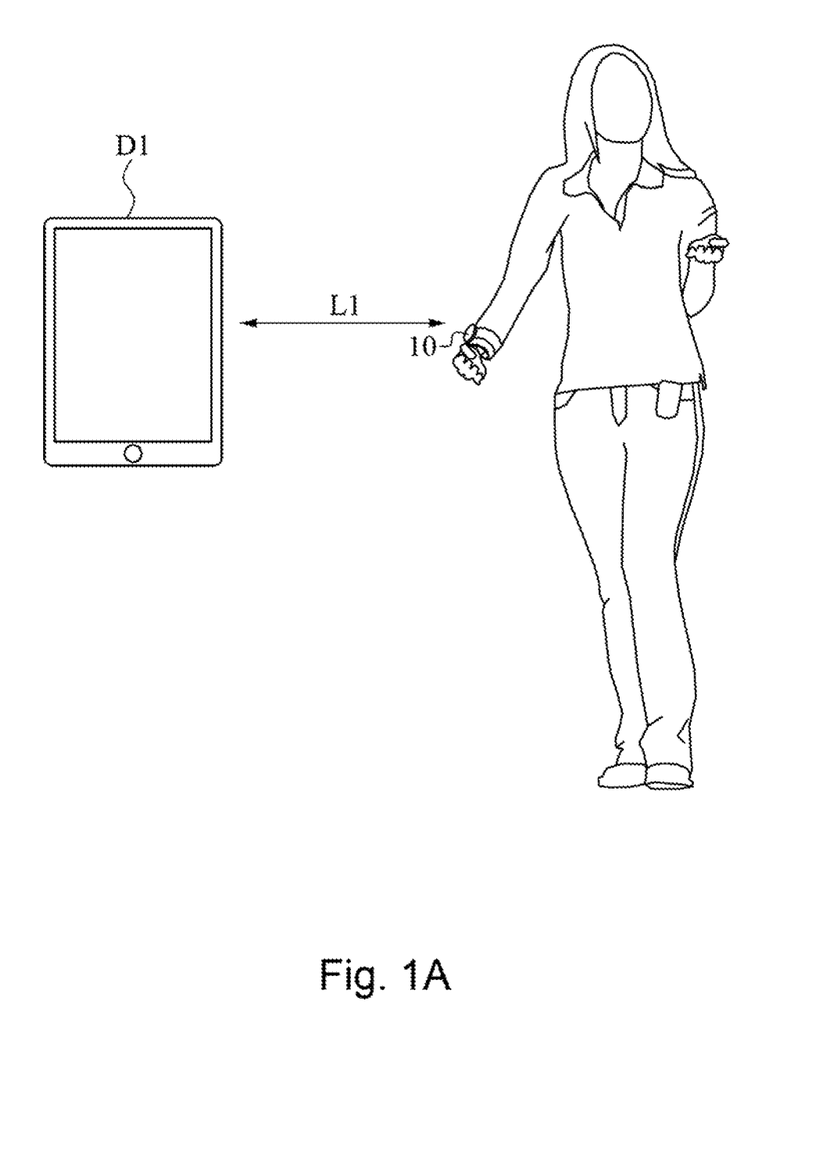
FIGS. 1A to 1B are usage scenario views of an identification system illustrated according to an embodiment of the present invention.
Figure 1B:
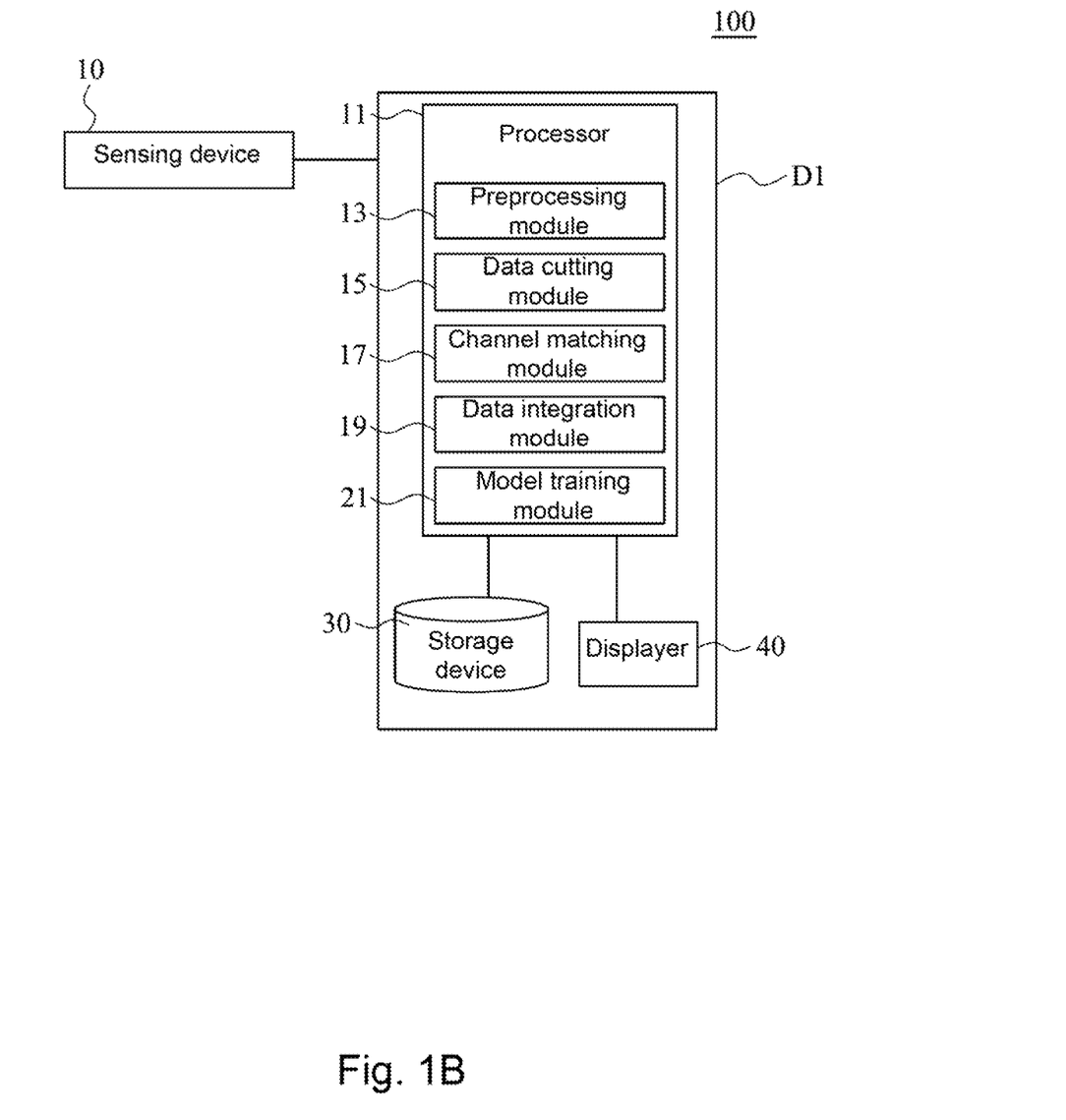

Referring to FIGS. 1A to 1B, FIG. 1A is a usage scenario view of an identification system illustrated according to an embodiment of the present invention. FIG. 1B is a block diagram of an identification system 100 illustrated according to an embodiment of the present invention. As shown in FIG. 1A, when a user wears a sensing device 10, the sensing device 10 can be used to sense movement information. The sensing device 10 is, for example, a smart watch, a smart bracelet or other electronic devices capable of being used to sense a user's movement.

In an embodiment, the movement information sensed by the sensing device 10 may include sustainable motions (e.g., bicycling and running) and non-sustainable motions. The non-sustained motions may be a single specific motion (e.g., circle drawing in the air) or various continuous motions (e.g., writing in the air).

In an embodiment, the sensing device 10 may establish a communication link L1 with an electronic device D1 through a transmission module (such as Bluetooth and Wi-Fi) thereof and send the sensed information to the electronic device D1 by means of the communication link L1.

For example, when the sensing device 10 is implemented by a smart watch, the smart watch can obtain a value of acceleration of a user's hand motion. In other words, when the hand of the user moves, the value of acceleration is generated continuously. If the value of acceleration is represented with a two-dimensional diagram (e.g., the horizontal axis represents time, and the vertical axis represents the value of acceleration), the value of acceleration maybe in a waveform shape such that the user's motions have a sequential relationship.

In an embodiment, the electronic device D1 is can be implemented by a mobile phone, a tablet, a desktop computer, a notebook computer, or other electronic devices having calculation functions. In an embodiment, the electronic device D1 can be a server located in a cloud system.

In one embodiment, the identification system 100 includes a processor 11. The processor 11 is used for receiving movement data from a sensing device 10. In one embodiment, the processor 11 includes a preprocessing module 13, a data cutting module 15, a channel matching module 17, a data integration module 19 and a model training module 21.

In one embodiment, the preprocessing module 13, the data cutting module 15, the channel matching module 17, the data integration module 19 and the model training module 21 may be implemented respectively or in a combination as a microcontroller, a microprocessor, a digital signal processor, an application specific integrated circuit (ASIC) or a logic circuit.

In one embodiment, the identification system 100 further includes a storage device 30 for storing calculation results of the processor 11 and/or the movement data transmitted from the sensing device 10.

In one embodiment, the identification system 100 further includes a displayer 40 for displaying the calculation results of the processor 11 and/or the movement data transmitted from the sensing device 10.

In one embodiment, the storage device 30 may be implemented as a read-only memory, a flash memory, a floppy disk, a hard disk, an optical disk, a flash drive, a magnetic tape, a database accessible by a network, or a storage medium which has the same function as above and may easily come into the mind of those skilled in the art.

Figure 2:
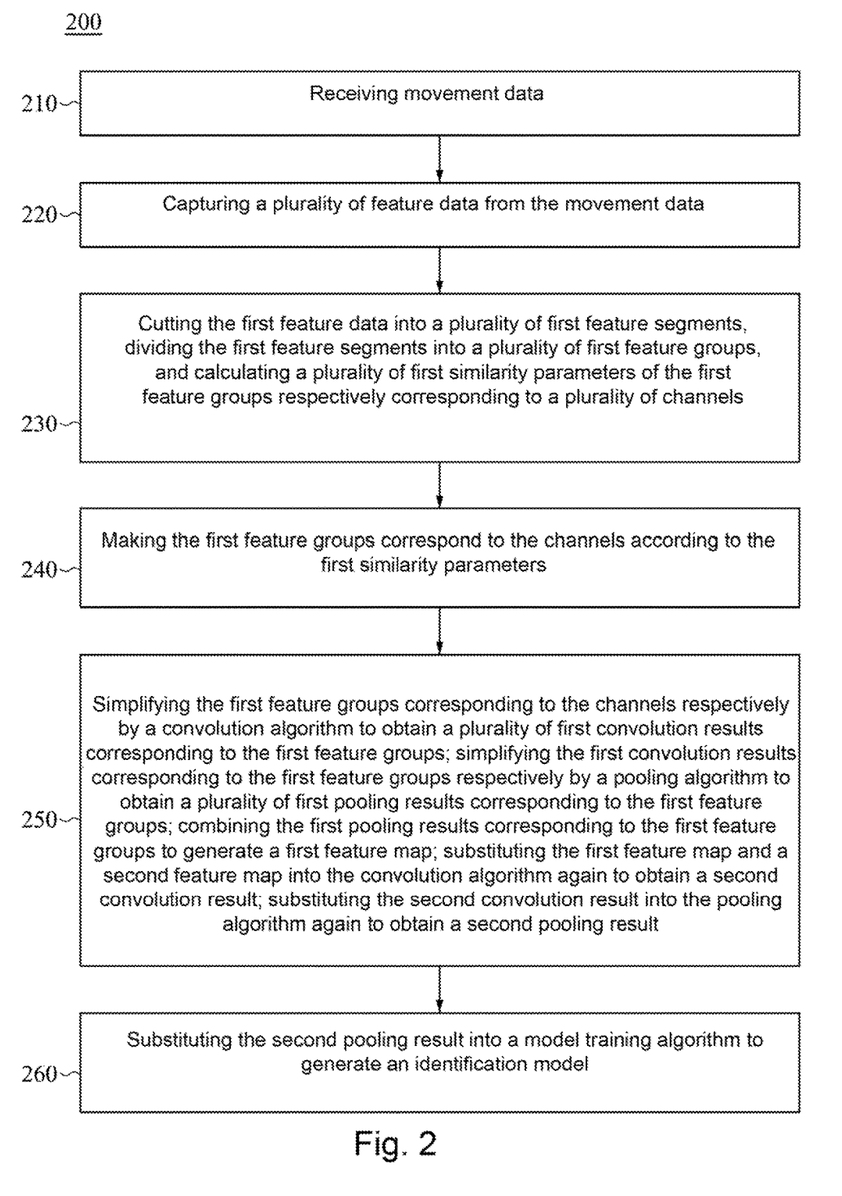
FIG. 2 is a flow chart of an identification method illustrated according to an embodiment of the present invention.

Referring to FIG. 2, FIG. 2 is a flow chart of an identification method 200 illustrated according to an embodiment of the present invention.

In step 210, the processor 11 receives movement data from a sensing device 10.

In step 220, the preprocessing module 13 captures a plurality of feature data from the movement data.

Figure 3:
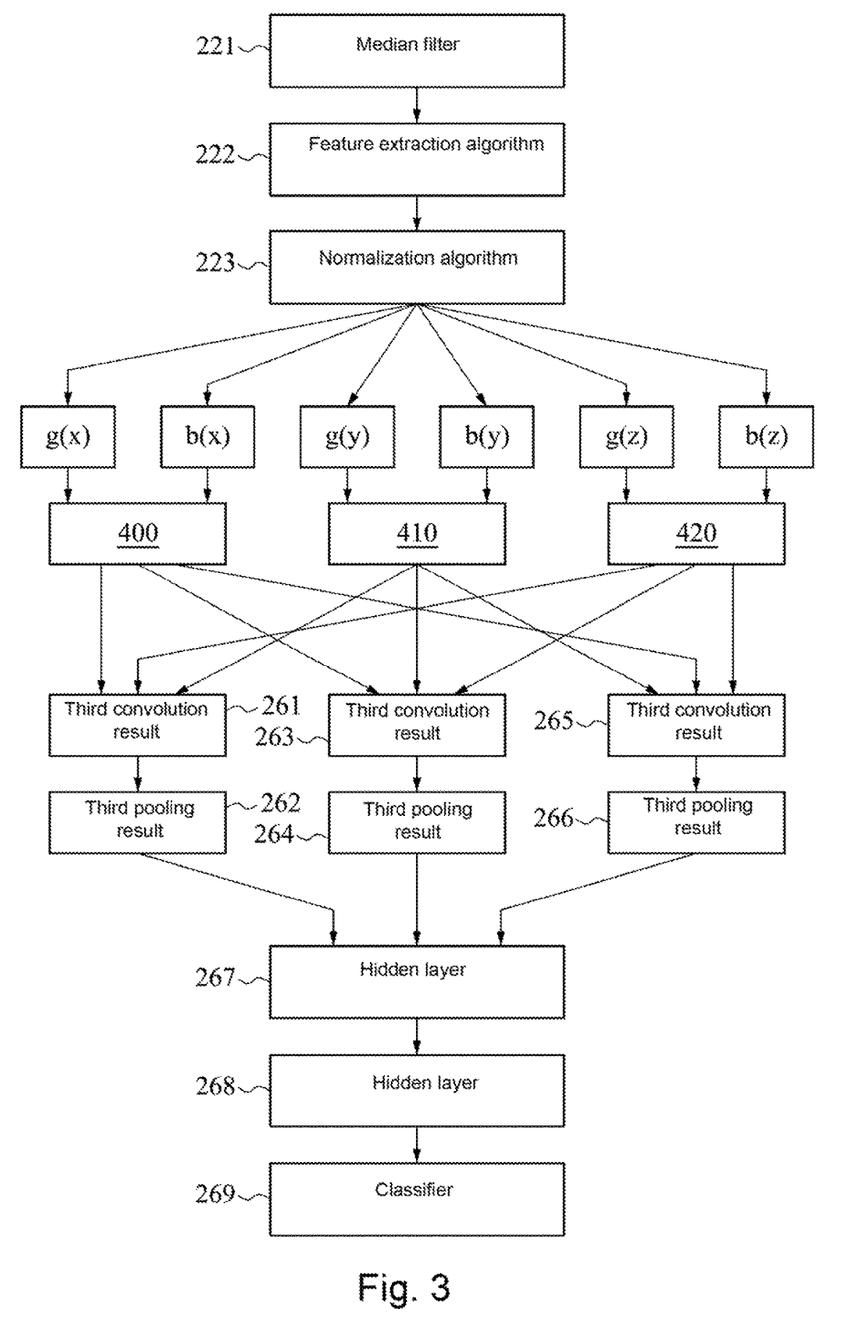
FIG. 3 is a schematic operation flow chart of an identification system illustrated according to an embodiment of the present invention.
Figure 4:
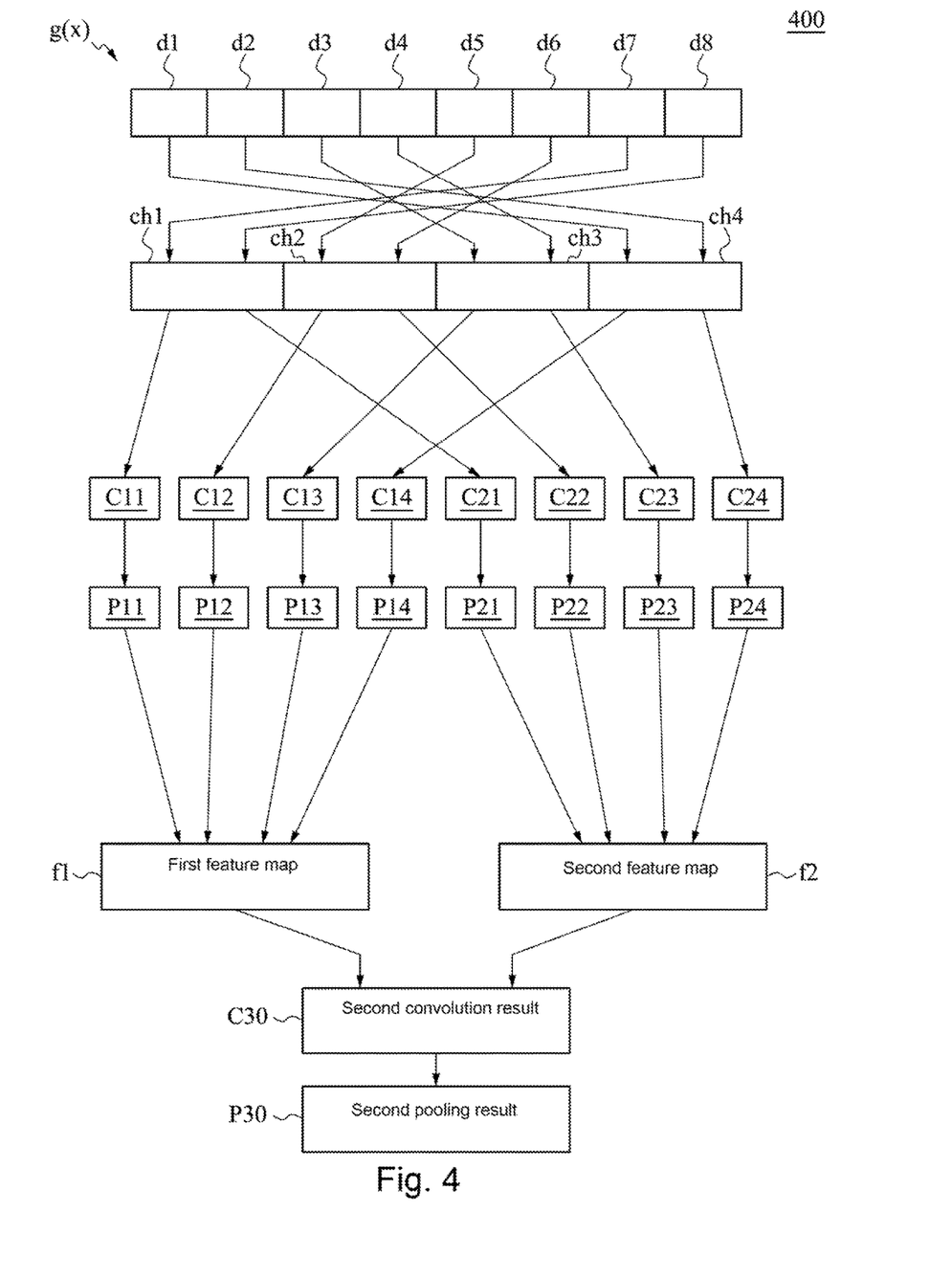
FIG. 4 is a schematic view of a part of an identification method illustrated according to an embodiment of the present invention.

Referring to FIGS. 3 and 4, FIG. 3 is a schematic operation flow chart of an identification system illustrated according to an embodiment of the present invention. FIG. 4 is a schematic view of a part 400 of an identification method illustrated according to an embodiment of the present invention. As shown in FIG. 3, in steps 221 to 223, the preprocessing module 13 sequentially substitutes the movement data into a median filter, a feature extraction algorithm and a normalization algorithm to process the movement data. And, in these steps, the existing median filter, the feature extraction algorithm and the normalization algorithm and the like can be adopted to perform data processing. In addition, in these steps, the preprocessing can be performed by applying a known motion identification method. Thus, the steps are not repeated herein.

In one embodiment, the feature data include first feature data (such as $g(x)$) and second feature data (such as $b(x)$). In one embodiment, if the movement data is X-axis acceleration data, the first feature data $g(x)$ and the second feature data $b(x)$ can be generated, and the first feature data $g(x)$ and the second feature data $b(x)$ serve as input data of the part 400 of the identification method. If the movement data is y-axis acceleration data, first feature data $g(y)$ and second feature data $b(y)$ can be generated, and the first feature data $g(y)$ and the second feature data $b(y)$ serve as input data of a part 410 of the identification method. If the movement data is z-axis acceleration data, first feature data $g(z)$ and second feature data $b(z)$ can be generated, and the first feature data $g(z)$ and the second feature data $b(z)$ serve as input data of a part 420 of the identification method.

Moreover, since the steps in the parts 400, 410 and 420 of the identification method are similar, subsequently only the part 400 of the identification method is described in detail, and the description of the parts 410 and 420 of the identification method is no longer repeated.

In one embodiment, after the preprocessing module 13 captures the first feature data (e.g., gravity data g(x) in acceleration data) from the movement data (e.g., X-axis acceleration data), the preprocessing module 13 can subtract the first feature data from the movement data, and the obtained remaining data is determined as second feature data. That is, the movement data part in the first feature data excepting the gravity feature data is determined as the second feature data (such as b(x)).

In another embodiment, after the preprocessing module 13 captures the first feature data and the second feature data from the movement data, the remaining data is determined as third feature data. And, the remaining data is obtained by the first feature data and the second feature data are subtracted from the movement data.

Therefore, after the movement data is divided into various feature data (such as the first feature data, the second feature data and the third feature data) through feature extraction by the preprocessing module 13, the combination of all feature data can still form the original movement data.

Thus, by means of this feature extraction mode, the problem of information loss occurred during feature extraction of the movement data can be solved.

In step 230, the data cutting module 15 cuts the first feature data into a plurality of first feature segments, divides the first feature segments into a plurality of first feature groups, and calculates a plurality of first similarity parameters of the first feature groups respectively corresponding to a plurality of channels.

In one embodiment, as shown in FIG. 4, when the first feature data g(x) serves as input data of the part 400 of the identification method, the data cutting module 15 cuts the first feature data g(x) into 8 first feature segments d1 to d8 according to a time sequence and divides the first feature segments d1 to d8 into groups according to the time sequence. For example, every two first feature segments serve as one group (e.g., the first feature segments d1 and d2 serve as one group, the first feature segments d3 and d4 serve as one group, the first feature segments d5 and d6 serve as one group, and the first feature segments d7 and d8 serve as one group), so as to obtain the first feature groups.

The time sequence refers to the sequential order of generating the first feature segments d1 to d8 of the first feature data (for example, the time sequence is related to the sequential order of a user's hand shaking mode).

In one embodiment, the number of first feature groups is equal to the number of channels. For example, when the number of the channels is 4, the first feature segments d1 to d8 are divided into 4 groups.

In one embodiment, the data cutting module 15 cuts the second feature data (such as b(x)) into a plurality of second feature segments and divides the second feature segments into a plurality of second feature groups. In one embodiment, the number of the second feature groups is equal to the number of the channels.

Next, the data cutting module 15 calculates a plurality of first similarity parameters of the first feature groups respectively corresponding to a plurality of channels (for example, the first feature segments d1 and d2 are determined as a first feature group, the first feature segments d3 and d4 are determined as a first feature group, the first feature segments d5 and d6 are determined as a first feature group, and the first feature segments d7 and d8 are determined as a first feature group).

In one embodiment, the channel matching module 17 calculates an average, a covariance, a distance value and/or a correlation coefficient value of a plurality of content values of each of the first feature groups, so as to obtain the first similarity parameters.

For example, when the content values of one of the first feature segments (e.g., the first feature segments d1 and d2 are one of the first feature groups) include 2 and 4 (e.g., the content value of the first feature segment d1 is 2 and the content value of the first feature segment d2 is 4), the two values are averaged ((2+4)/2=3) to obtain 3, the similarity parameter of this first feature group is determined as 3, and so on, so as to calculate similarity parameter values of other first feature groups.

In step 240, the channel matching module 17 makes the first feature groups correspond to the channels according to the first similarity parameters.

Referring to FIGS. 5A to 5D, FIGS. 5A to 5D are schematic views of a channel matching method illustrated according to an embodiment of the present invention. In one embodiment, the channel matching module 17 can calculate the distances between the first similarity parameters and respective channels.

In one embodiment, contents in the first feature segments d1 to d8 can correspondingly be eight segments of data (ordered according to a time sequence) which are [1, 2, 3, 4, 5, 6, 7, 8] respectively. After the data cutting module 15 divides these data into 4 first feature groups, the content values of these first feature groups are [1, 2], [3, 4], [5, 6] and [7, 8] respectively. After respective similarity parameter values are calculated in accordance with the content values of these first feature groups (e.g., respective similarity parameter values of these first feature groups are calculated by utilizing known statistical methods such as the aforementioned average, covariance, distance value and/or correlation coefficient value), in step 240, the channel matching module 17 makes these first feature groups correspond to these channels (e.g., four channels ch1 to ch4) according to these first similarity parameters.

In one embodiment, the channel matching module 17 can configure the most suitable channel by calculating the distance values of the first similarity parameters respectively corresponding to the channels and continuously selecting the first similarity parameter with the minimum distance to access the channel. Hereafter an embodiment of the channel matching method is illustrated through FIGS. 5A to 5D by way of example, but the present invention is not limited to it.

Figure 5A:
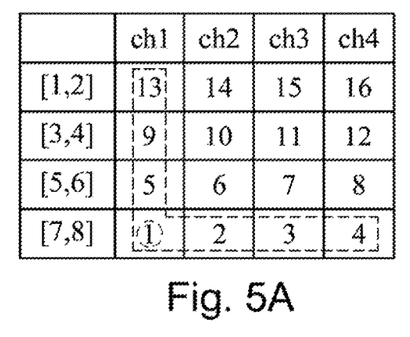
FIGS. 5A to 5D are schematic views of a channel matching method illustrated according to an embodiment of the present invention.

As shown in FIG. 5A, if the channel matching module 17 calculates the respective first similarity parameters of the content values [1, 2], [3, 4], [5, 6] and [7, 8] of the first feature groups (for example, the channel matching module 17 calculates the first similarity parameter of the content value [1, 2] of the first feature group, the first similarity parameter of the content value [3, 4] of the first feature group, the first similarity parameter of the content value [5, 6] of the first feature group and the first similarity parameter of the content value [7, 8] of the first feature group), and then works out that the distance values of the first similarity parameters corresponding to the channel ch1 respectively are 13, 9, 5 and 1 (e.g., the respective similarity parameter values of the first feature groups are calculated by utilizing the known statistical methods such as the aforementioned average, covariance, distance value and/or correlation coefficient value), it can be found that the first feature group [7, 8] has a minimum distance of 1 corresponding to the channel ch1, thus the first feature group [7, 8] is transmitted through the channel ch1. Since the channel ch1 and the first feature group [7, 8] have been matched, in the follow-up FIGS. 5B to 5D, fields related to the channel ch1 (column) and the first feature group [7, 8] (row) are no longer determined.

Figure 5B:
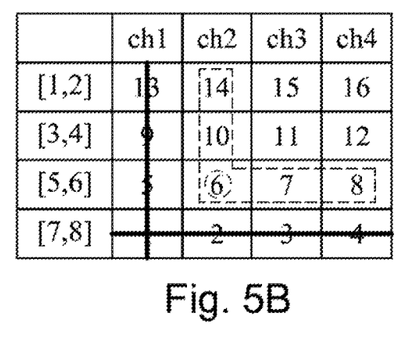

Next, as shown in FIG. 5B, if the channel matching module 17 calculates that the distance values of the respective first similarity parameters of the first feature groups [1, 2], [3, 4] and [5, 6] corresponding to the channel ch2 respectively are 14, 10 and 6, it can be found that the first feature group [5, 6] has a minimum distance value of 6 corresponding to the channel ch2, and thus the first feature group [5, 6] is transmitted through the channel ch2. Since the channel ch2 and the first feature group [5, 6] have been matched, in the follow-up FIGS. 5C and 5D, fields related to the channel ch2 (column) and the first feature group [5, 6] (row) are no longer determined.

Figure 5C:
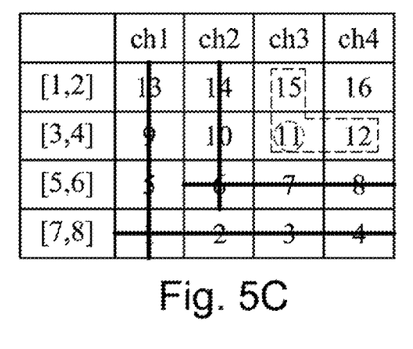

Next, as shown in FIG. 5C, if the distance values of the respective first similarity parameters of the first feature groups [1, 2] and [3, 4] corresponding to the channel ch3 are 15 and 11, it can be found that the first feature group [3, 4] has a minimum distance value of 11 corresponding to the channel ch3, and thus the first feature group [3, 4] is transmitted through the channel ch3. Since the channel ch3 and the first feature group [3, 4] have been matched, in the follow-up FIG. 5D, fields related to the channel ch3 (column) and the first feature group [3, 4] (row) are no longer determined.

Figure 5D:
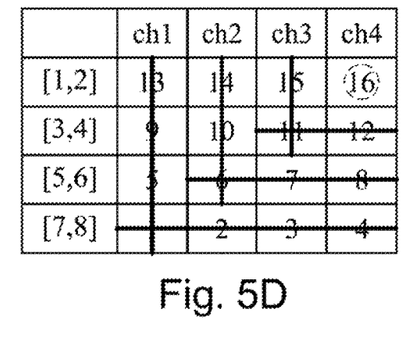

Next, as shown in FIG. 5D, if the channel matching module 17 determines that only one first feature group, i.e., the first feature group [1, 2] remains unmatched, the first feature group [1, 2] is made correspond to the channel ch4.

Accordingly, the channel matching module 17 can make the first feature groups correspond to the channels according to the first similarity parameters.

In one embodiment, similarly, the channel matching module 17 calculates a plurality of second similarity parameters of the second feature groups respectively corresponding to the channels ch1 to ch4, and makes the second feature groups correspond to the channels ch1 to ch4 according to the second similarity parameters.

However, the values of the aforementioned first feature groups are only a simple example, the data quantity during the actual system application may be presented as a matrix containing plenty of numerical values, and thus the present invention is not limited to it.

In step 250, the data integration module 19 is used for simplifying the first feature groups corresponding to the channels respectively by a convolution algorithm to obtain a plurality of first convolution results corresponding to the first feature groups, simplifying the first convolution results corresponding to the first feature groups respectively by a pooling algorithm to obtain a plurality of first pooling results corresponding to the first feature groups, combining the first pooling results corresponding to the first feature groups to generate a first feature map f1, substituting the first feature map f1 and a second feature map f2 into the convolution algorithm again to obtain a second convolution result, and substituting the second convolution result into the pooling algorithm again to obtain a second pooling result.

In one embodiment, as shown in FIG. 4, after the data integration module 19 simplifies the first feature groups corresponding to the channels ch1 to ch4 respectively by a convolution algorithm, a plurality of first convolution results C11 to C14 corresponding to the first feature groups are generated (for example, after the data integration module 19 simplifies the first feature groups in the channel ch1 respectively by a convolution algorithm, first convolution results C11 are generated). Next, the data integration module 19 simplifies the first convolution results C11 to C14 corresponding to the first feature groups respectively by a pooling algorithm to obtain a plurality of first pooling results P11 to P14 corresponding to the first feature groups (for example, the data integration module 19 simplifies the first convolution results C11 corresponding to the first feature groups respectively by a pooling algorithm to obtain first pooling results P11), so as to generate a first feature map f1. The first feature map f1 is composed of the first pooling results P11 to P14.

Similarly, the data integration module 19 simplifies the second feature groups corresponding to the channels ch1 to ch4 respectively by the convolution algorithm to obtain the first convolution results C21 to C24 corresponding to the second feature groups, simplifies the first convolution results C21 to C24 corresponding to the second feature groups respectively by a pooling algorithm to obtain the first pooling results P21 to P24 corresponding to the second feature groups, and combines the first pooling results P21 to P24 corresponding to the second feature groups to generate a second feature map f2. The second feature map f2 is composed of the first pooling results P21 to P24.

Next, the data integration module 19 substitutes the first feature map f1 and a second feature map f2 into the convolution algorithm again to obtain a second convolution result C30, and substituting the second convolution result C30 into the pooling algorithm again to obtain a second pooling result P30.

Next, the second pooling result P30 is substituted back to FIG. 3 to continue the simplifying, so as to obtain a third convolution result (e.g., a third convolution result 261). Moreover, steps of parts 400, 410 and 420 of the identification method are similar, so that the parts 410 and 420 of the identification method can also obtain a second pooling result thereof generated respectively in accordance with the first feature data g(y) and the second feature data b(y) and the first feature data g(z) and the second feature data b(z), and thus the description of the parts 410 and 420 is no longer repeated herein.

Figure 6:
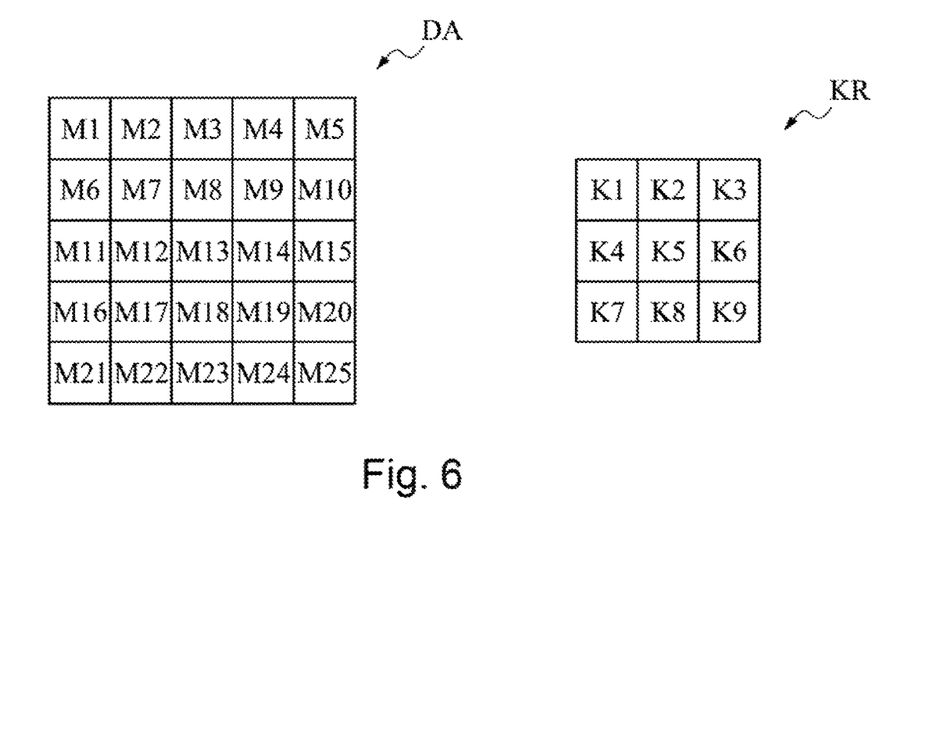
FIG. 6 is a schematic view of a convolution algorithm illustrated according to an embodiment of the present invention.

An embodiment of the convolution algorithm is described below. Referring to FIG. 6, FIG. 6 is a schematic view of a convolution algorithm illustrated according to an embodiment of the present invention. In FIG. 6, a first feature group DA represents one of a plurality of first feature groups and includes content values M1 to M25. A feature mapping core KR includes content values K1 to K9, and the feature mapping core KR is used for simplifying the first feature group DA. First, the content values K1 to K9 in the feature mapping core KR are made sequentially correspond to content values M1, M2, M3, M6, M7, M8, M11, M12 and M13 of the first feature group DA, and content values respectively corresponding thereto are multiplied and then summed. For example, values corresponding to the content values K1, K2, K3, K4, K5, K6, K7, K8 and K9 respectively are 1, 0, 1, 0, 2, 3, 1, 1 and 0, the values corresponding to the content values M1, M2, M3, M6, M7, M8, M11, M12 and M13 respectively are 2, 3, 0, 1, 2, 0, 0, 1 and 2, and the content values respectively corresponding thereto are multiplied and then summed, such that it can be obtained that 1*2+0*3+1*0+0*1+2*2+3*0+1*0+1*1+0*2=7 (a first simplified value). Next, the entire feature mapping core KR is translated rightwards by one grid, so that the content values K1 to K9 sequentially correspond to the content values M2, M3, M4, M7, M8, M9, M12, M13 and M14 of the first feature group DA, and the content values respectively corresponding to the content values K1 to K9 and the content values M2, M3, M4, M7, M8, M9, M12, M13 and M14 are multiplied and then summed in a similar manner as described above, so as to obtain a second simplified value. Next, the entire feature mapping core KR is translated rightwards by one grid, so that the content values K1 to K9 sequentially correspond to the content values M3, M4, M5, M8, M9, M10, M13, M14 and M15 of the first feature group DA, the content values respectively corresponding to the content values K1 to K9 and the content values M3, M4, M5, M8, M9, M10, M13, M14 and M15 are multiplied and then summed in a similar manner as described above, so as to obtain a third simplified value. Next, the entire feature mapping core KR is translated downwards by one grid and leans against the left-most, so that the content values K1 to K9 sequentially correspond to the content values M6, M7, M8, M11, M12, M13, M16, M17 and M18 of the first feature group DA, the content values respectively corresponding to the content values K1 to K9 and the content values M6, M7, M8, M11, M12, M13, M16, M17 and M18 are multiplied and then summed in a similar manner as described above, so as to obtain a fourth simplified value, and so on. Calculating modes of the remaining simplified values are analogized according to this. Accordingly, nine simplified values, for example sequentially arranged as a matrix (a convolution result) of a sudoku grid shape, can be finally obtained.

It thus can be seen that this algorithm enables the first feature group DA originally containing 25 content values to be simplified into 9 simplified values through the feature mapping core KR; in other words, after the original 5*5 matrix of the first feature group DA is simplified by the convolution algorithm to obtain a 3*3 matrix. Furthermore, the content values in the feature mapping core KR can be set in accordance with data features, and accordingly effects of extracting important information and greatly reducing a follow-up calculation amount can be achieved.

Figure 7:
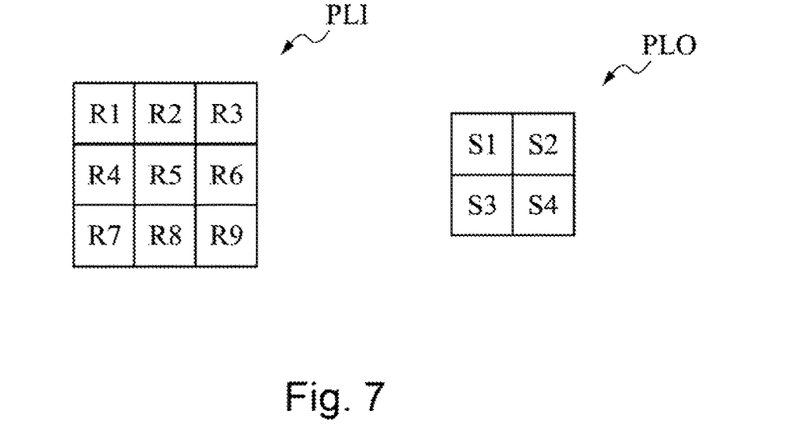
FIG. 7 is a schematic view of a pooling algorithm illustrated according to an embodiment of the present invention.

An example of the pooling algorithm is described below. Referring to FIG. 7, FIG. 7 is a schematic view of a pooling algorithm illustrated according to an embodiment of the present invention. In one embodiment, after the first convolution results PLI are input into the pooling algorithm, the first convolution results PLI can be simplified through a matrix PLO. For example, after the content values S1, S2, S3 and S4 in the matrix PLO are made respectively correspond to the content values R1, R2, R4 and R5 of the first convolution results P11, the maximum value (such as 4) among the values of the content values R1, R2, R4 and R5 (e.g., 1, 2, 3 and 4 respectively) can be selected to serve as a first simplified value. Next, the matrix PLO is translated rightwards by one grid, and after the content values S1, S2, S3 and S4 in the matrix PLO are made respectively correspond to the content values R2, R3, R5 and R6 of the first convolution results PLI, the maximum value among the values of the content values R2, R3, R5 and R6 can be selected to serve as a second simplified value. Next, the matrix PLO is translated downwards by one grid and leans against the left-most, and after the content values S1, S2, S3 and S4 in the matrix PLO are made respectively correspond to the content values R4, R5, R7 and R8 of the first convolution results PLI, the maximum value among the values of the content values R4, R5, R7 and R8 can be selected to serve as a third simplified value. Next, the matrix PLO is translated rightwards by one grid, and after the content values S1, S2, S3 and S4 in the matrix PLO are made respectively correspond to the content values R5, R6, R8 and R9 of the first convolution results PLI, the maximum value among the values of the content values R5, R6, R8 and R9 can be selected to serve as a fourth simplified value.

Accordingly, four simplified values, for example sequentially arranged as a matrix (a pooling result) of a matts shape, can be obtained finally.

It thus can be known that the pooling algorithm can simplify the first convolution results PLI originally containing 9 content values into 4 simplified values; in other words, the first convolution results PLI is originally a 3*3 matrix, and after the first convolution results PLI are simplified by the pooling algorithm, a 2*2 matrix can be obtained. Accordingly, through the pooling algorithm, effects of further extracting important information and greatly reducing the follow-up calculation amount can be achieved.

It needs to be noted that in the present invention, the present invention is not limited to adopting the maximum among the four content values as the simplified values, and pooling results can be simplified in various modes such as an average, a minimum and a median.

In step 260, the model training module 21 substitutes the second pooling result into a model training algorithm to generate an identification model.

In one embodiment, as shown in FIG. 3, after the data integration module 19 generates a plurality of second pooling results through methods 400, 410 and 420 (that is, after step P30 illustrated by FIG. 4 is executed), these second pooling results are substituted into the convolution algorithm to generate a plurality of third convolution results 261, 263 and 265, and the third convolution results are substituted into the pooling algorithm to obtain a plurality of third pooling results 262, 264 and 266.

In one embodiment, the third convolution result 261 is obtained by calculating the second pooling results generated by the methods 400, 410 and 420. In addition, the modes of generating the third convolution results 263 and 265 are similar to the mode of generating the third convolution result 261, and thus the modes are no longer repeated herein.

In one embodiment, the model training module 21 trains a model and generates an identification model according to the third pooling results.

In one embodiment, the model training algorithm is at least one of a neural network algorithm, a support vector machine, a decision tree, a Bayesian classifier, an expectation maximization and a K-nearest neighbor. When the model training algorithm is the neural network algorithm, the identification model is generated by means of at least one hidden layer 267 and 268 and a classifier 269 of the neural network algorithm.

Since the model training algorithm for generating the identification model in step 260 can be applied through the prior art, the model training algorithm is not repeated herein.

In one embodiment, after the identification model is established, if the electronic device D1 receives new sensing information, key features in the sensing information can be identified through the steps 210-250, and the identification model is utilized to judge what motion of a user the sensing information corresponds to.

In one embodiment, the identification model can receive multi-dimensional data (namely data obtained by simplifying the new sensing message through the steps 210-250), receive a value list or range (e.g., three motions and respectively corresponding value lists or ranges thereof) and/or receive parameters well-adjusted by the model. In one embodiment, the identification model in the processor 11 can perform calculation slightly (e.g., a comparison, averaging, variance evaluating and other statistical methods) to find a user's motion corresponding to the multi-dimensional data.

For example, when the average of all values in the multi-dimensional data is within the value list or range of the circle drawing by the hand, the processor 11 determines that the hand motion of the user is circle drawing.

For another example, when the processor 11 determines that the probability of the motion corresponding to left-right shaking of the hand is 10% while the probability of the motion corresponding to vertical shaking of the hand is 90% according to the variances of all values in the multi-dimensional data, the processor 11 determines that the hand motion of the user is vertical shaking.

Figure 8A:
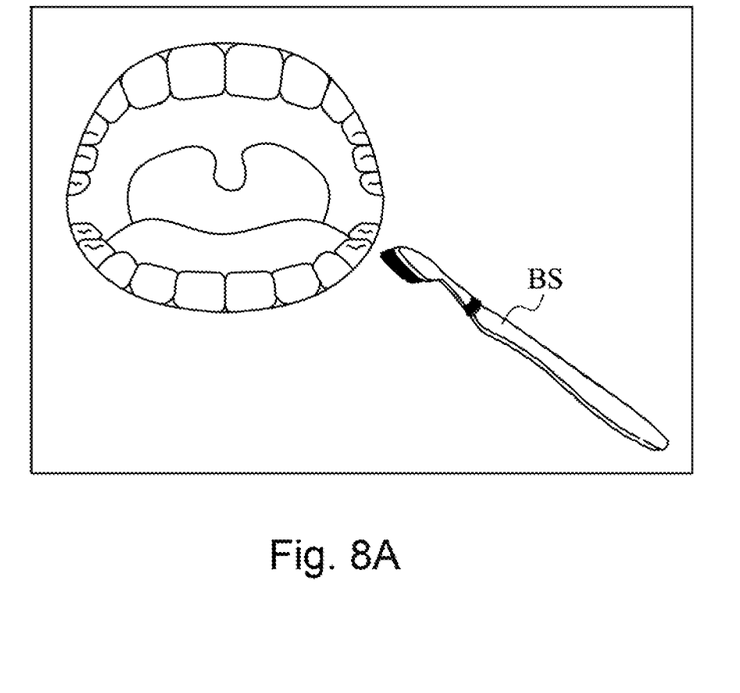
FIGS. 8A to 8B are schematic views of application of an identification system illustrated according to an embodiment of the present invention.
Figure 8B:
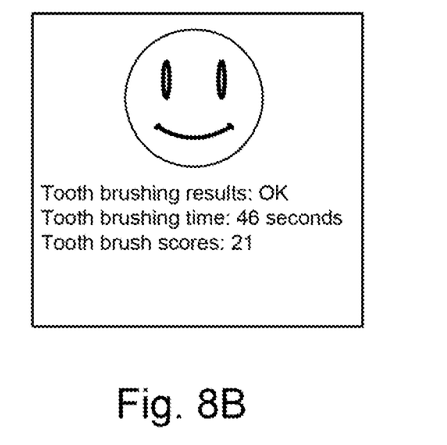

Referring to FIGS. 8A and 8B, FIGS. 8A to 8B are schematic views of application of an identification system illustrated according to an embodiment of the present invention. In one embodiment, the identification method of the present invention can be implemented in an application program (APP) in an electronic device D1 (e.g., a mobile phone), or data collected by the sensing device 10 is transmitted to the electronic device D1 (e.g., a cloud server) at the far end through the application program to perform calculation. In this example, when the sensing device 10 is a smart watch, a user can wear the sensing device 10 and brush his/her teeth, the user's hand motion of taking a toothbrush can be transmitted to the sensing device 10, and the sensing device 10 can accurately judge the user's motion of brushing his/her teeth and displays the position of a toothbrush drawing BS corresponding to teeth through a displayer 40 of the electronic device D1. After the user brushes his/her teeth, the user's tooth brushing situation (as shown in FIG. 8B) is displayed through a user interface of the application program, and thus the user learns about whether he/she has brushed his teeth correctly.

Figure 9A:
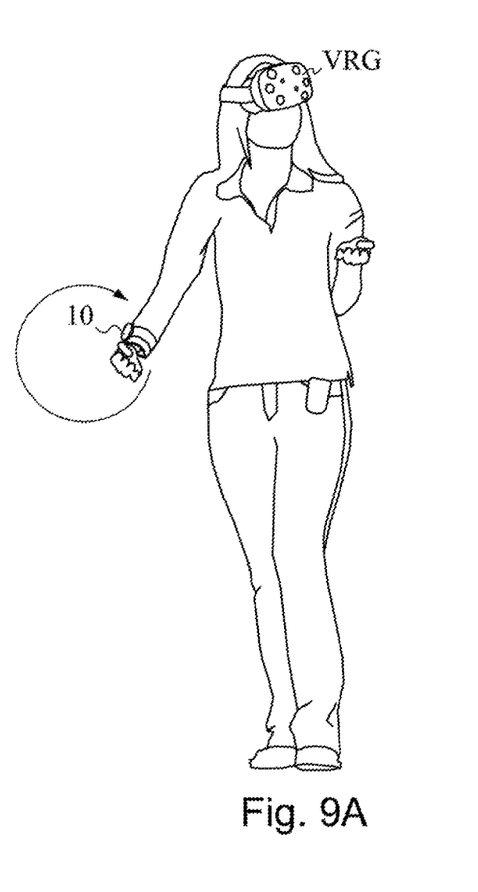
FIGS. 9A to 9C are schematic views of application of an identification system illustrated according to an embodiment of the present invention.
Figure 9B:
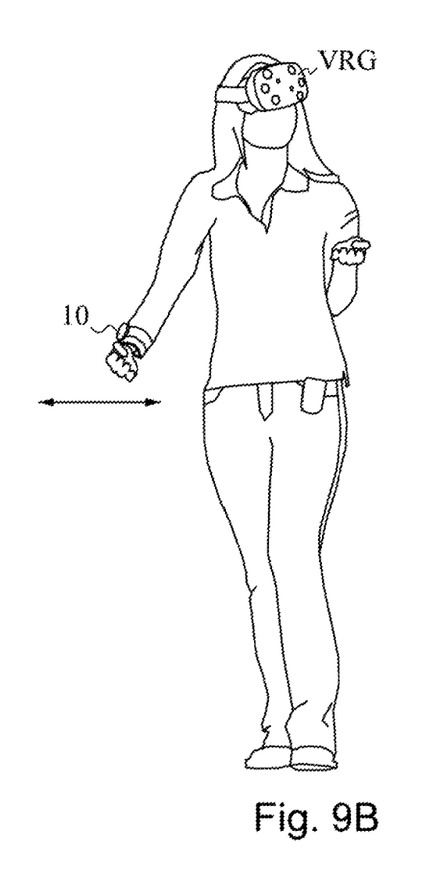
Figure 9C:
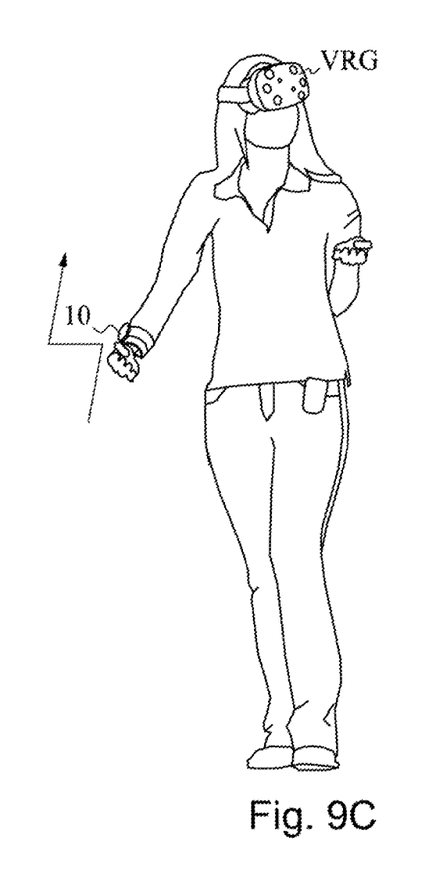

Referring to FIGS. 9A to 9C, FIGS. 9A to 9C are schematic views of application of an identification system illustrated according to an embodiment of the present invention. As shown in FIGS. 9A to 9C, the identification system 100 of the present invention can also be used in virtual reality operation; for example, when a user wears a pair of virtual reality glasses (VRG) on his head and wears the sensing device 10 on his hand, the identification system 100 of the present invention can accurately capture features through a time sequence to filter out unnecessary noises (such as hand starting motion for circle drawing and a too small segment length), so as to accurately identify the user's motions such as circle drawing (such as in FIG. 9A), left-right shaking (such as in FIG. 9B) or shaking in a lightning shape (such as in FIG. 9C). However, the present invention is not limited to these examples of determining the gestures.

By means of the identification system and the identification method of the present invention, features can be captured automatically according to a time sequence. The sustained and the non-sustained motions can be analyzed clearly. The sustained motions represent that the same motion (e.g., teeth are always brushed transversely) is performed during a period of time (such as 3 min) and repeated for many times. The non-sustained motions may be a single specific motion or various continuous motions. For example, the single specific motion represents that a circle drawing motion is performed during a period of short time (e.g., 1 second), and the circle drawing motion is performed only once. The various continuous motions, namely continuous motions, represent that a plurality of "single specific motions" (e.g., a circle drawing motion is followed by a lightning motion, and the lightning motion is followed by a hack and slash motion, and the motions also includes a plurality of circle drawing motions) are performed during a period of time (such as 30 seconds). By distinguishing each one of the serial motions, the present invention can distinguish the motion differences more accurately, so as to achieve an effect of improving motion identification precision. Moreover, by application of the pooling algorithm and the convolution algorithm, in the present invention the calculation amount can be greatly reduced, and key motion features can be obtained precisely.

Though the present invention has been disclosed through the embodiments as above, the embodiments are not intended to limit the present invention. Any of those skilled in the art can perform various modifications and polishing without departing from the spirit and scope of the present invention, and thus the protective scope of the present invention should be subject to the claims.

What is claimed is:

1. An identification system, comprising:
   a processor for receiving movement data from a sensing device, wherein the processor comprises:
   a preprocessing module for capturing a plurality of feature data from the movement data, wherein the feature data comprise a first feature data and a second feature data;
   a data cutting module for cutting the first feature data into a plurality of first feature segments, dividing the first feature segments into a plurality of first feature groups and calculating a plurality of first similarity parameters of the first feature groups respectively corresponding to a plurality of channels;
   a channel matching module for making the first feature groups correspond to the channels according to the first similarity parameters;
   a data integration module for simplifying the first feature groups corresponding to the channels respectively by a convolution algorithm to obtain a plurality of first convolution results corresponding to the first feature groups, simplifying the first convolution results corresponding to the first feature groups respectively by a pooling algorithm to obtain a plurality of first pooling results corresponding to the first feature groups, combining the first pooling results corresponding to the first feature groups to generate a first feature map, substituting the first feature map and a second feature map into the convolution algorithm again to obtain a second convolution result, and substituting the second convolution result into the pooling algorithm again to obtain a second pooling result; and
   a model training module for substituting the second pooling result into a model training algorithm to generate an identification model.

2. The identification system of claim 1, wherein the data cutting module further is used for cutting the first feature data into the first feature segments according to a time sequence and dividing the first feature segments into groups according to the time sequence to obtain the first feature groups.

3. The identification system of claim 2, wherein the time sequence refers to the sequential order of generating the first feature segments in the first feature data.

4. The identification system of claim 1, wherein the data cutting module cuts the second feature data into a plurality of second feature segments and divides the second feature segments into groups to obtain a plurality of second feature groups;
   the channel matching module calculates a plurality of second similarity parameters of the second feature groups respectively corresponding to the channels, and makes the second feature groups correspond to the channels according to the second similarity parameters; and the data integration module simplifies the second feature groups corresponding to the channels respectively by the convolution algorithm to obtain the first convolution results corresponding to the second feature groups, simplifies the first convolution results corresponding to the second feature groups respectively by the pooling algorithm to obtain the first pooling results corresponding to the second feature groups, and combines the first pooling results corresponding to the second feature groups to generate the second feature map.

5. The identification system of claim 1, wherein the model training algorithm is at least one of a neural network algorithm, a support vector machine, a decision tree, a Bayesian classifier, an expectation maximization and a K-nearest neighbor, wherein when the model training algorithm is the neural network algorithm, the identification model is generated by means of at least one hidden layer and a classifier of the neural network algorithm.

6. The identification system of claim 1, wherein after capturing the first feature data from the movement data, the preprocessing module determines a remaining data as the second feature data, and the remaining data is obtained by subtracting the first feature data from the movement data.

7. The identification system of claim 1, wherein the movement data is an acceleration data, and the first feature data is a gravity data.

8. The identification system of claim 1, wherein the data integration module is further used for generating a plurality of second pooling results, substituting the second pooling results into the convolution algorithm to generate a plurality of third convolution results, substituting the third convolution results into the pooling algorithm respectively to obtain a plurality of third pooling results.

9. The identification system of claim 8, wherein the model training module generates the identification model according to the third pooling results.

10. The identification system of claim 1, wherein the channel matching module calculates an average, a covariance, a distance value or a related coefficient value of a plurality of content values of each of the first feature groups, so as to obtain the first similarity parameters.

11. An identification method, comprising:
sensing movement data;
capturing a plurality of feature data from the movement data; wherein the feature data comprise a first feature data and a second feature data;
cutting the first feature data into a plurality of first feature segments, dividing the first feature segments into a plurality of first feature groups, and calculating a plurality of first similarity parameters of the first feature groups respectively corresponding to a plurality of channels;
making the first feature groups correspond to the channels according to the first similarity parameters;
simplifying the first feature groups corresponding to the channels respectively by a convolution algorithm to obtain a plurality of first convolution results corresponding to the first feature groups;
simplifying the first convolution results corresponding to the first feature groups respectively by a pooling algorithm to obtain a plurality of first pooling results corresponding to the first feature groups;

combining the first pooling results corresponding to the first feature groups to generate a first feature map;
substituting the first feature map and a second feature map into the convolution algorithm again to obtain a second convolution result;
substituting the second convolution result into the pooling algorithm again to obtain a second pooling result; and
substituting the second pooling result into a model training algorithm to generate an identification model.

12. The identification method of claim 11, further comprising:
cutting the first feature data into the first feature segments according to a time sequence and dividing the first feature segments into the first feature groups according to the time sequence.

13. The identification method of claim 12, wherein the time sequence refers to the sequential order of generating the first feature segments in the first feature data.

14. The identification method of claim 11, further comprising:
cutting the second feature data into a plurality of second feature segments and dividing the second feature segments into a plurality of second feature groups;
calculating a plurality of second similarity parameters of the second feature groups respectively corresponding to the channels, and making the second feature groups correspond to the channels according to the second similarity parameters;
simplifying the second feature groups corresponding to the channels respectively by the convolution algorithm to obtain the first convolution results corresponding to the second feature groups;
simplifying the first convolution results corresponding to the second feature groups respectively by the pooling algorithm to obtain the first pooling results corresponding to the second feature groups; and
combining the first pooling results corresponding to the second feature groups to generate a second feature map.

15. The identification method of claim 11, wherein the model training algorithm is at least one of a neural network algorithm, a support vector machine, a decision tree, a Bayesian classifier, an expectation maximization and a K-nearest neighbor, wherein when the model training algorithm is the neural network algorithm, the identification model is generated by means of at least one hidden layer and a classifier of the neural network algorithm.

16. The identification method of claim 11, further comprising:
after the first feature data is captured from the movement data first, determining a remaining data as the second feature data, wherein the remaining data is obtained by subtracting the first feature data from the movement data.

17. The identification method of claim 11, wherein the movement data is an acceleration data, and the first feature data is a gravity data.

18. The identification method of claim 11, further comprising:
generating a plurality of second pooling results, substituting the second pooling results into the convolution algorithm to generate a plurality of third convolution results; and
substituting the third convolution results into the pooling algorithm to obtain a plurality of third pooling results.

19. The identification method of claim 18, wherein the model training module generates the identification model according to the third pooling results.

20. The identification method of claim 11, further comprising:
calculating an average, a covariance, a distance value or a related coefficient value of a plurality of content values of each of the first feature groups, so as to obtain the first similarity parameters.

* * * * *